H. BALL.
Oven.
No. 105,541.
3 Sheets—Sheet 3.
Patented July 19, 1870.
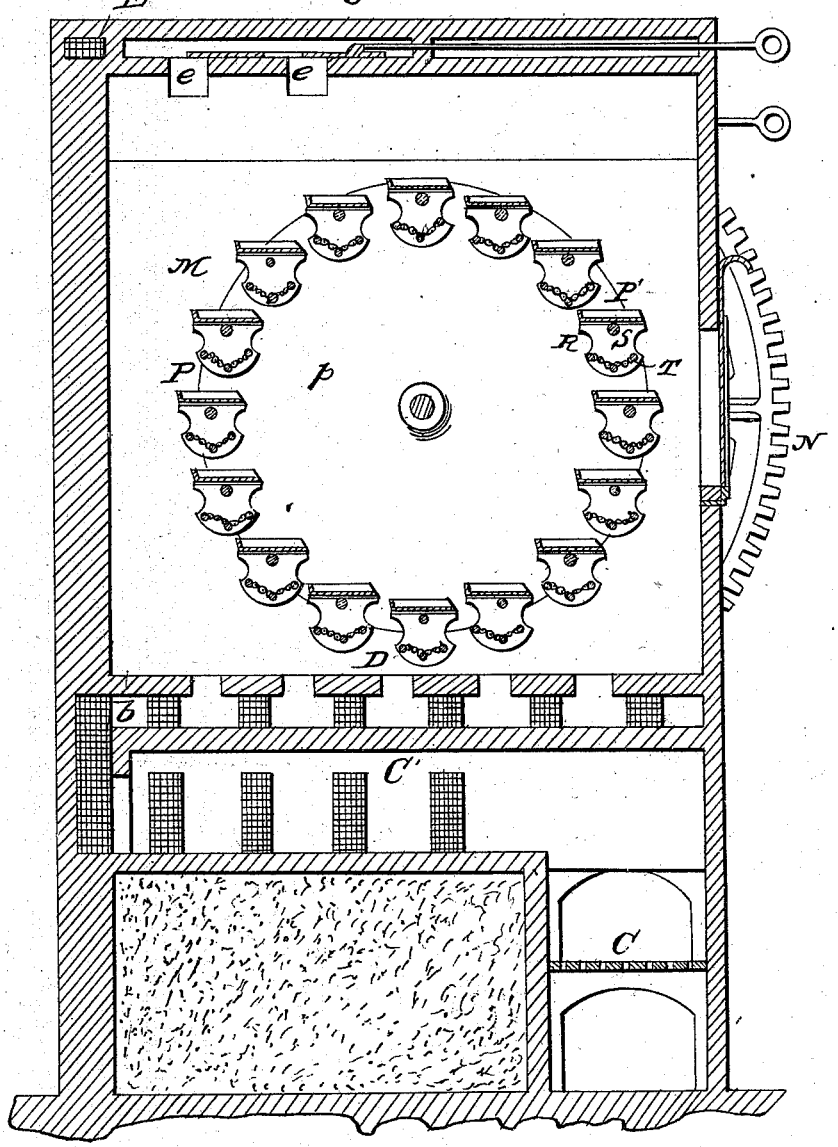
Witnesses
Jas. Meldrum
Wm. H. Brereton Jr.
Inventor
Hosen Ball
By Knight Bro
Attys.

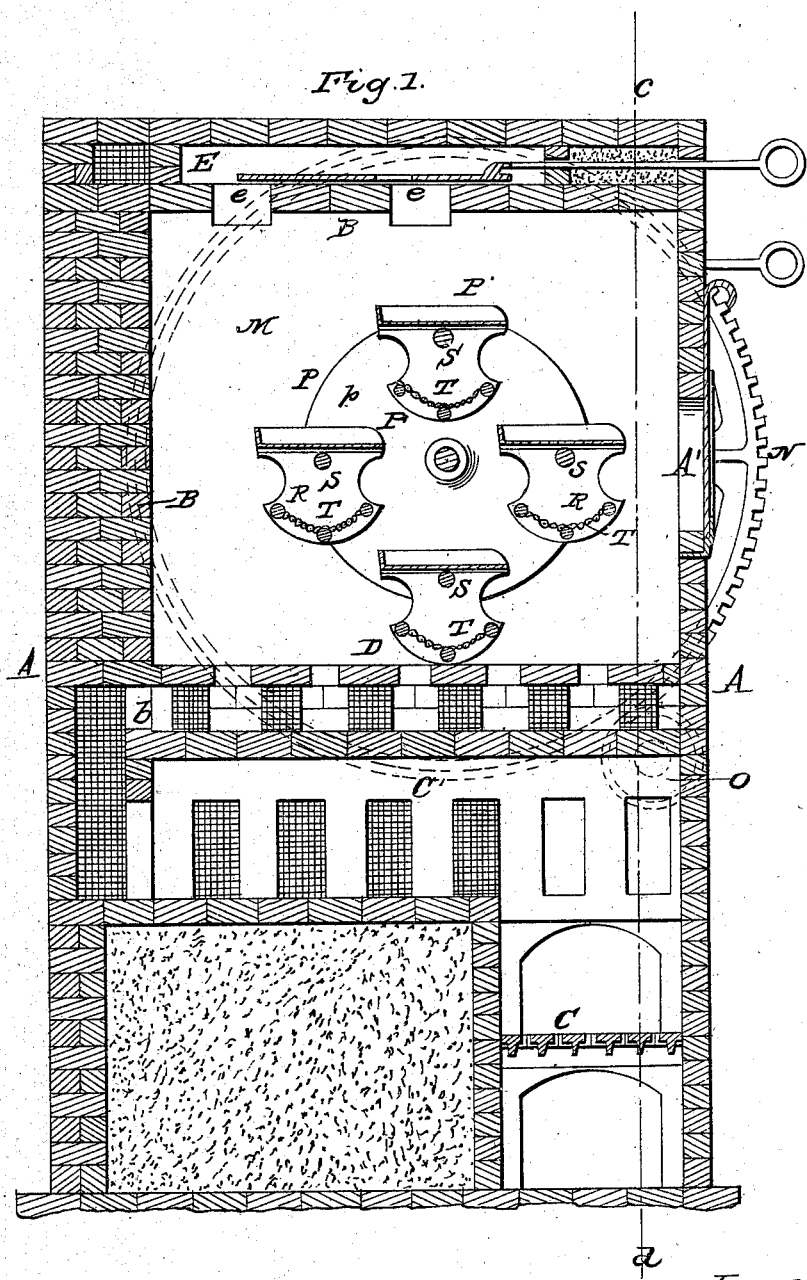

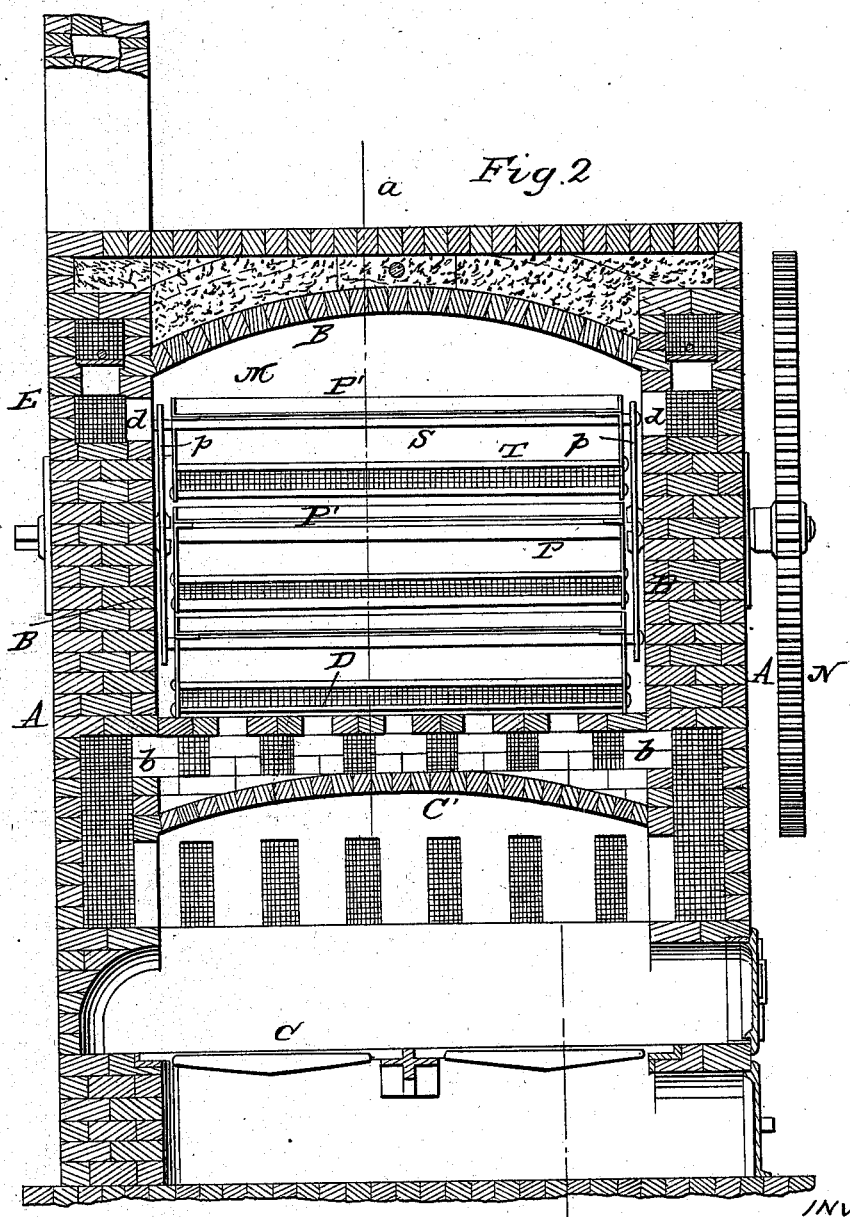

UNITED STATES PATENT OFFICE.

HOSEA BALL, OF NEW YORK, N. Y.

OVEN.

Specification forming part of Letters Patent No. 105,541, dated July 19, 1870.

I, HOSEA BALL, of the city, county, and State of New York, have invented an Improvement in Ovens, of which the following is a specification:

Nature and Objects of the Invention.

My invention relates to the class known as reel-ovens, in which the bread-receivers are pivoted to the ends of the arms or end plates of a revolving reel. Instead of suspending the bread trays or receivers at some distance below the arms, by which means the diameter of the reel, which may be used within an oven of given size, is materially reduced, I place the pan above the horizontal bar of the reel, and preserve its horizontality by means of a pendulous weight suspended beneath the axis of support. This suspended weight consists of a basket, perforated plate, or receptacle, to be filled with broken brick, or other suitable material, which answers several purposes—first, when a given basket, as I prefer to term it, is at the bottom of its revolution, it absorbs considerable heat, owing to its proximity to the arch. This, being carried off, is utilized upon the bottom of the pan, when the latter is more remote from the heated arch; second, the basket is, to some extent, interposed between batches of bread on adjacent trays, and prevents the direct transmission of steam heat from the batch on a given pan to the bottom of the pan above.

Another and very important part of my invention relates to the manner of introducing the heated gases to the baking-chamber. Instead of carrying them directly through the arch, or promiscuously through the walls of the chamber, I employ a solid arch, which will retain and equalize the heat in a more effective manner than a perforated arch, and above the arch I apply a perforated floor, beneath which the heated gases are introduced, and through which they are distributed uniformly over the lower part and entire area of the oven.

Description of the Accompanying Drawing.

Figure 1 is a vertical transverse section at right angles to the axis of the reel, the plane of section being shown by the dotted line $a\,b$, Fig. 2. Fig. 2 is a vertical section on a plane at right angles to the former, the plane of section being shown by the dotted line $c\,d$, Fig. 1. Fig. 3 is a sectional view, showing an oven with a reel furnished with sixteen bread-pans.

General Description.

The invention belongs to that class of ovens in which the bread-pans are supported on the arms of a rotating reel within an oven, as in my patent for an improved oven dated September 23, 1856, and reissued October 12, 1869.

A A are the outer walls of the oven, and are usually of brick, as are also the inner walls B B; C, is the furnace, and C' the arch or ceiling of the furnace-chamber. Between the walls are flue-spaces up to the level of the perforated floor D, which distribute the air beneath the oven-chamber proper, and which will be described presently. Above the level of the said perforated floor the walls are solid to a height even with the line of the greatest elevation of the bread-pans, or thereabout. At this level are apertures $d\,d$ in the side walls, through which the heat may pass from the oven to the upper flues E E, and to the chimney, or these holes may be closed by dampers, and the heated gases, &c., may pass out at the ceiling of the oven by apertures $e$, which conduct the said gases to the flues E E and the chimney. The apertures $e$ are also provided with dampers. In the side and back inner walls B B are openings $b\,b$, which admit the heated air and gases to the space or the passages beneath the perforated floor D', through whose openings the said caloric current is distributed into the main chamber M of the oven. This floor is situated a distance above the arch C', and may, like the latter, be of brick, so laid as to afford intervals for the passage of the air, or it may be a perforated plate. The object of the floor is to distribute the heat in the oven, and to avoid its striking upwardly immediately from the holes $b\,b$, and so leaving a portion of the interior unequally heated. To secure a uniform supply at each part, it may be advisable to make the floor-openings near the middle larger than those in more immediate proximity to the holes $b\,b$ in the side and back walls.

Mounted on a horizontal axis within the principal chamber M of the oven, and turned by outside means—to wit., a wheel, N, pinion, O, and crank—is a reel, P, consisting of heads $p\,p$ and rods $s\,s$. The latter are parallel with the axis, and form supports for the bread-pans P', one to each rod. The ends of each bread-pan are fastened to cheek-pieces R, which are journaled on the rod s, so as to swing freely thereon. A basket, T, of wire-gauze, stiffened with rods, is attached by its ends to the lower portions of the cheek-pieces R, and forms a pendulous weight, which keeps the bread-pan above it in an approximately horizontal position, so as to receive the unbaked loaves, and maintain the proper position, while the reel is transporting them around the oven from the place at which they are first deposited on the pans, thence downward toward the arch, up at the rearward part of the oven, then by the ceiling, and eventually at the door A', where they are removed, and other loaves of dough substituted to perform the same round.

I have called these pendulous receptacles T-baskets, as that fairly describes their preferable form. I place in them broken bricks, or other suitable material, which may absorb heat at the hottest portions of the oven, and impart it to the bottoms of the pans when they have arrived at a cooler part of the oven. They also act, at times, in another capacity, intervening between a loaf and the bottom of the pan above it, so as to intercept, to some extent, steam heat, which may be passing from the bread.

While I prefer the basket form which I have described and represented, I desire to state that I do not confine myself to such, but may make the pendulous receptacle as a mere platform. Its foraminous or perforated surface, however, should be retained, as it should not obstruct the passage of the heat to the bottom of the pan.

In baking crackers the brick may be dispensed with, so far as their baking action is concerned, and the basket is merely used as a counterbalance to keep the pans horizontal.

The number of bread-pans on the reel, and the proportions of the reel relatively to the oven, will vary with the required capacity for work.

In Fig. 3 is shown an arrangement for sixteen pans on a reel.

*Claims.*

What I claim as new is—

1. The bread-pan, arranged above its axis of support, and provided with a pendulous weight beneath, by which its horizontality is sufficiently maintained.

2. In combination with a bread-pan, arranged as described in claim 1, the basket, plate, or containing-receptacle, which, besides its functions as a weight, may be utilized to contain material capable of absorbing and radiating heat, substantially as and for the purpose described.

3. A basket or plate, suspended from a swinging pan or platform, whether the pan be above or below the axis of support.

4. A basket or plate, placed or suspended below the pan, for the purpose described, used or to be used in any oven in which the pans or bottom are mechanically moved during the baking process, whether the motion be by a reel, a rotating platform, a chain, a band, or otherwise.

5. The combination, with the crown or furnace arch, of a grating or perforated or reticulated floor above it, substantially as and for the purpose herein set forth.

To the above specification of my improvements in ovens I have signed my hand this 7th day of May, A. D. 1870.

HOSEA BALL.

Witnesses:
EDWARD H. KNIGHT,
JAS. MELDRUM.